United States Patent
Goudarzi et al.

(10) Patent No.: US 11,126,311 B2
(45) Date of Patent: *Sep. 21, 2021

(54) CAPACITIVE SENSING ACQUISITION SCHEMES

(71) Applicant: Synaptics Incorporated, San Jose, CA (US)

(72) Inventors: Katayoun Goudarzi, Los Gatos, CA (US); John Weinerth, San Jose, CA (US); Derek Solven, San Jose, CA (US); David Hoch, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/994,460

(22) Filed: Aug. 14, 2020

(65) Prior Publication Data

US 2020/0379590 A1    Dec. 3, 2020

Related U.S. Application Data

(63) Continuation of application No. 16/226,123, filed on Dec. 19, 2018, now Pat. No. 10,788,939.

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01)

(58) Field of Classification Search
CPC ................. G06F 3/04166; G06F 3/044; G06F 2203/04107; G06F 3/0418; H03K 17/96
See application file for complete search history.

(56) References Cited

U.S. PATENT DOCUMENTS

| | | | |
|---|---|---|---|
| 10,788,939 B2 * | 9/2020 | Goudarzi | .............. G06F 3/0418 |
| 2011/0074723 A1 | 3/2011 | Reynolds | |
| 2018/0081466 A1 | 3/2018 | Moon | |
| 2018/0253180 A1 | 9/2018 | Bie et al. | |

* cited by examiner

*Primary Examiner* — Abbas I Abdulselam
(74) *Attorney, Agent, or Firm* — Ferguson Braswell Fraser Kubasta PC (57) ABSTRACT

An input device including a sensing region is disclosed. The input device includes: sensor circuitry configured to: operate, during a first timeslot, electrodes as a first cluster; and operate, during a second timeslot, the electrodes as a second cluster, where the electrodes are aligned with an axis, and where at least one of the electrodes operates as a transmitter in the first cluster and as a receiver in the second cluster; and determination circuitry configured to: determine a first set of signal values associated with a first set of electrodes in the first cluster; determine a second set of signal values associated with a second set of electrodes in the second cluster; and generate a profile for the sensing region based on the first set of signal values and the second set of signal values, where the profile reflects an input object in the sensing region.

10 Claims, 6 Drawing Sheets

| Electrode No.: | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Cluster A: | (X) | O | T | O | X | (X) | O | T | O | X | (X) | O | T | O | X | (X) |
| Cluster B: | O | (X) | X | O | T | O | (X) | X | O | T | O | (X) | X | O | T | O |
| Cluster C: | T | O | X | X | O | T | O | X | X | O | T | O | X | X | O | T |
| Cluster D: | (X) | T | O | T | O | (X) | T | O | T | O | (X) | T | O | T | O | (X) |
| Cluster E: | O | O | O | X | X | O | O | O | X | X | O | O | O | X | X | O |
| Electrode No.: | 1 | 2 | 3 | 4 | 5 | 6 | 7 | 8 | 9 | 10 | 11 | 12 | 13 | 14 | 15 | 16 |

Common Receiver Electrodes for Cluster A & Cluster D 305

Common Receiver Electrodes for Cluster B & Cluster D 310

☐ T  TX Electrode
☐ X  RX Electrode
☐ O  Shielding Electrode

CAPACITIVE SENSING ACQUISITION SCHEMES

CROSS REFERENCE TO RELATED APPLICATIONS

The present application is a continuation of, and thereby claims benefit under 35 U.S.C. § 120 to, U.S. patent application Ser. No. 16/226,123, filed on Dec. 19, 2018 and incorporated herein by reference in its entirety.

TECHNICAL FIELD

The described embodiments relate generally to electronic devices, and more specifically, to proximity sensor devices that generate a profile of a sensing region by operating parallel (or approximately parallel) electrodes as different clusters during different timeslots.

BACKGROUND

Input devices including proximity sensor devices such as touchpads or touch sensor devices, are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may also be used to detect finger, styli, or pens.

The presence of some input objects (e.g., water drops/moisture, low ground mass objects, etc.) may be difficult to detect using traditional capacitive sensing techniques. Despite the difficulties, it remains important to detect these objects.

SUMMARY

In general, in one aspect, one or more embodiments relate to an input device comprising a sensing region. The input device comprises: sensor circuitry configured to: operate, during a first timeslot, a plurality of electrodes as a first cluster; and operate, during a second timeslot, the plurality of electrodes as a second cluster, wherein the plurality of electrodes are aligned with an axis, and wherein at least one of the plurality of electrodes operates as a transmitter in the first cluster and as a receiver in the second cluster; and determination circuitry configured to: determine a first set of signal values associated with a first set of electrodes in the first cluster; determine a second set of signal values associated with a second set of electrodes in the second cluster; and generate a profile for the sensing region based on the first set of signal values and the second set of signal values, wherein the profile reflects an input object in the sensing region.

In general, in one aspect, one or more embodiments relate to a method for operating an input device comprising a sensing region. The method comprises: operating, during a first timeslot, a plurality of electrodes as a first cluster; operating, during a second timeslot, the plurality of electrodes as a second cluster, wherein the plurality of electrodes are aligned with an axis, and wherein at least one of the plurality of electrodes operates as a transmitter in the first cluster and as a receiver in the second cluster; determining a first set of signal values associated with a first set of electrodes in the first cluster; determining a second set of signal values associated with a second set of electrodes in the second cluster; and generating a profile for the sensing region based on the first set of signal values and the second set of signal values, wherein the profile reflects an input object in the sensing region.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention provide input devices and methods that may facilitate improved usability along with various other benefits.

Figure 1:
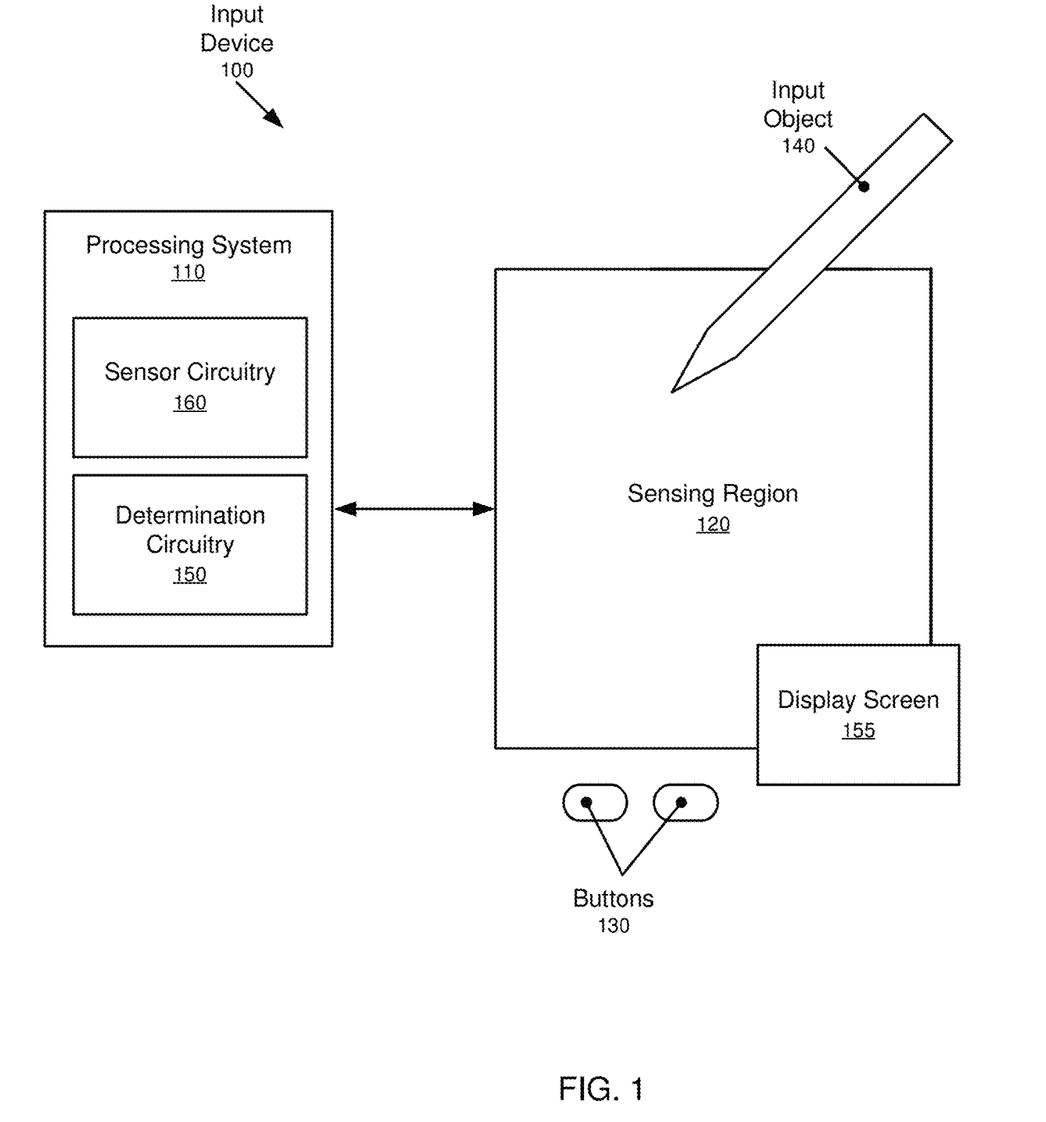
FIG. 1 and FIG. 2 show an input device in accordance with one or more embodiments.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). Examples of electronic systems (or electronic devices) may include personal computers (e.g., desktop computers, laptop computers, tablet computers, netbook computers, tablets, web browsers, e-book readers, and personal digital assistants (PDAs)), composite input devices (e.g., physical keyboards, joysticks, or key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). The electronic system can be a host or a slave to the input device.

The input device (100) may be implemented as a physical part of the corresponding electronic system, or may be physically separate from the electronic system. Further, portions of the input device (100) may be part of the electronic system. For example, all or part of the determination module (150) may be implemented in the device driver of the electronic system. The input device (100) may be coupled to and communicate with components of the electronic system using various wired or wireless technologies, such as buses and networks. Example technologies may include Inter-Integrated Circuit (I²C), Serial Peripheral Interface (SPI), PS/2, Universal Serial Bus (USB), Bluetooth®, Infrared Data Association (IrDA), and various radio frequency (RF) communication protocols defined by the IEEE 802.11 or other standards.

In the example of FIG. 1, the input device (100) may correspond to a proximity sensor device (e.g., a "touchpad" or a "touch sensor device") configured to sense input provided by one or more input objects (140) in a sensing region (120). Example input objects include styli, active pen, fingers, fingertips, and the like. The sensing region (120) may encompass any space above, around, in, and/or proximate to the input device (100) in which the input device (100) is able to detect user input (e.g., provided by one or more input objects 140)). The size, shape, and location of particular sensing region (120) (e.g., relative to the electronic system) may vary depending on actual implementations.

In some embodiments, the sensing region (120) extends from a surface of the input device (100) in one or more directions in space, for example, until a signal-to-noise ratio (SNR) of the sensors falls below a threshold suitable for object detection. For example, the distance to which this sensing region (120) extends in a particular direction may be on the order of less than a millimeter, millimeters, centimeters, or more, and may vary with the type of sensing technology used and/or the accuracy desired. In some embodiments, the sensing region (120) may detect inputs involving no physical contact with any surfaces of the input device (100), contact with an input surface (e.g. a touch surface) of the input device (100), contact with an input surface (e.g., a touch surface and/or screen) of the input device (100), contact with an input surface of the input device (100) coupled with some amount of applied force or pressure, and/or a combination thereof.

In various embodiments, input surfaces may be provided by, and/or projected on, one or more surfaces of housing of the input device (100) (e.g., as an image). For example, the sensing region (120) may have a rectangular shape when projected onto an input surface of the input device (100). In some aspects, inputs may be provided through images spanning one, two, three, or higher dimensional spaces in the sensing region (120). In some aspects, inputs may be provided through projections along particular axes or planes in the sensing region (120). Still further, in some aspects, inputs may be provided through a combination of images and projections in the sensing region (120).

The input device (100) may utilize various combination of sensor components and sensing technologies to detect user input in the sensing region (120). Example sensing technologies may include capacitive, elastive, resistive, inductive, magnetic, acoustic, ultrasonic, radio frequency (RF) waves, and/or optical sensing technologies. The input device (100) may include one or more sensing elements configured to implement the various sensing technologies.

In some embodiments, the input device (100) may utilize resistive sensing technologies to detect user inputs. For example, the sensing region (120) may be formed by a flexible and conductive first layer separated by one or more spacer elements from a conductive second layer. The sensing region (120) may detect user input by creating one or more voltage gradients across the layers when the first layer is brought into contact with the second layer. More specifically, pressing the flexible first layer may deflect it sufficiently to create electrical contact between the layers, resulting in voltage outputs reflective of the point(s) of contact between the layers. These voltage outputs may be used to determine positional information (e.g., indicating a position, in the sensing region 120) about the detected inputs.

In other embodiments, the input device (100) may utilize inductive sensing technologies to detect using inputs. For example, the sensing region (120) may include one or more sensing elements configured to pick up loop currents induced by a resonating coil or pair of coils. The input device (100) may then detect user inputs using a combination of the magnitude, phase, and frequency of the currents. The characteristics of the loop currents may be used to determine positional information about the detected inputs.

In yet other implementations, the input device system (100) may utilize radio frequency (RF) technologies to detect user inputs. For example, the sensing region (120) may include one or more sensing elements configured to receive/intercept/detect RF waves.

In some optical implementations of the input device system (100), one or more sensing elements are cameras (e.g., red-green-blue (RGB) cameras, infrared (IR) cameras, ultra violet (UV) cameras, etc.) that generate images of the sensing region and thus any input objects in the sensing region.

In some capacitive implementations of the input device system (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object proximate to the sensor electrodes alters the electric field associated with the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "trans capacitance") sensing methods based on changes in the capacitive coupling between sensor electrodes. In various embodiments, an input object proximate to the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g. other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. Further still, a processing system for an optical sensor (e.g., cameras) device may include circuitry configured to obtain and process images of the sensing region. In one more embodiments, a processing system for a combined capacitance sensor device and optical sensor device may include any combination of the above described circuitry. In some embodiments, the processing system (110) also includes electronically-readable instructions, such as firmware code, software code, and/or the like.

In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The sensor module (160) may include functionality to obtain images of the sensing region (120) from one or more cameras.

Although FIG. 1 shows a determination module (150) and a sensor module (160), alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes, cameras, and/or display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

Figure 2:
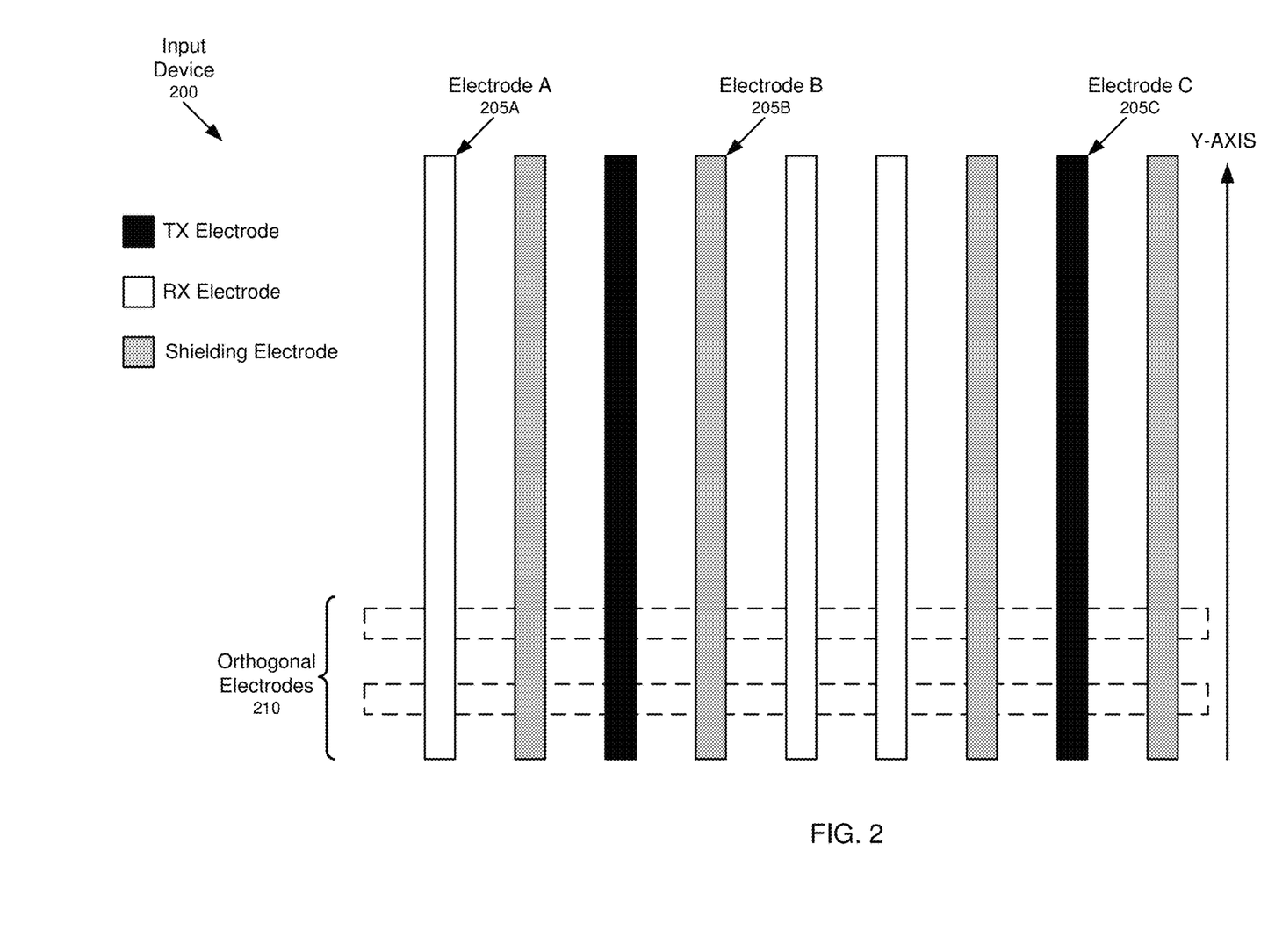

FIG. 2 shows an input device (200) in accordance with one or more embodiments. The input device (200) may correspond to input device (100), discussed above in reference to FIG. 1. As shown in FIG. 2, the input device (200) has multiple electrodes including electrode A (205A), electrode B (205B), and electrode C (205C). These multiple electrodes are aligned with an axis (e.g., y-axis). In other words, these multiple electrodes are parallel or approximately parallel with the axis. Moreover, these multiple electrodes are associated with a sensing region (e.g., sensing region (120), discussed above in reference to FIG. 1) and are coupled to a processing system (e.g., processing system (110), discussed above in reference to FIG. 1).

At any given time, some electrodes may be configured to operate as transmitter electrodes, some electrodes may be configured to operate as receiver electrodes, and some electrodes may be configured to operate as shielding electrodes. For example, during the timeslot depicted in FIG. 2, electrode A (205A) is configured to operate as a receiver electrode, electrode B (205B) is configured to operate as a shielding electrode, and electrode C (205C) is configured to operate as a transmitter electrode. However, during other timeslots, electrode A (205A) may be configured to operate as a transmitter electrode or a shielding electrode, electrode B (205B) may be configured to operate as a transmitter electrode or a receiver electrode, and electrode C (205C) may be configured to operate as a receiver electrode or a shielding electrode.

In one or more embodiments, a capacitance exists between the transmitter electrodes (e.g., electrode C (205C)) and the receiver electrodes (e.g., electrode A (205A)). This capacitance is reflected in the signal values determined (e.g., measured) from the receiver electrodes (e.g., electrode C (205C)). When present in the sensing region, an input object (e.g., finger, stylus, water drops/moisture, low ground mass object, etc.) may couple with one or more of the transmitter electrodes (e.g., electrode C (205C)) and change the electric field. This change in the electric field may then alter the signal values determined from one or more of the receiver electrodes (e.g., electrode A (205A)). The input object and its location in the sensing region may be detected based on the signal values and the changes in the signal values.

In one or more embodiments, the shielding electrodes (e.g., electrode B (205B)) are either grounded, driven by a guard voltage, or driven with the same modulated or DC voltage as the receiver electrodes (e.g., electrode A (205A)). As shown in FIG. 2, there exists one or more orthogonal electrodes (210). These orthogonal electrodes (210) may be orthogonal (or approximately orthogonal) to the axis (e.g., y-axis) and thus orthogonal (or approximately orthogonal) to the transmitter electrodes (e.g., electrode C (205C)), receiver electrodes (e.g., electrode A (205A)), and shielding electrodes (e.g., electrode B (205B)). Moreover, these orthogonal electrodes (210) may be grounded or driven with the same modulated or DC voltage as the receiver electrodes (e.g., electrode A (205A)). Additionally or alternatively, one or more of the orthogonal electrodes (210) may be driven by a guard voltage that is different than the voltage driving the receiver electrodes and/or shielding electrodes.

Figure 3:
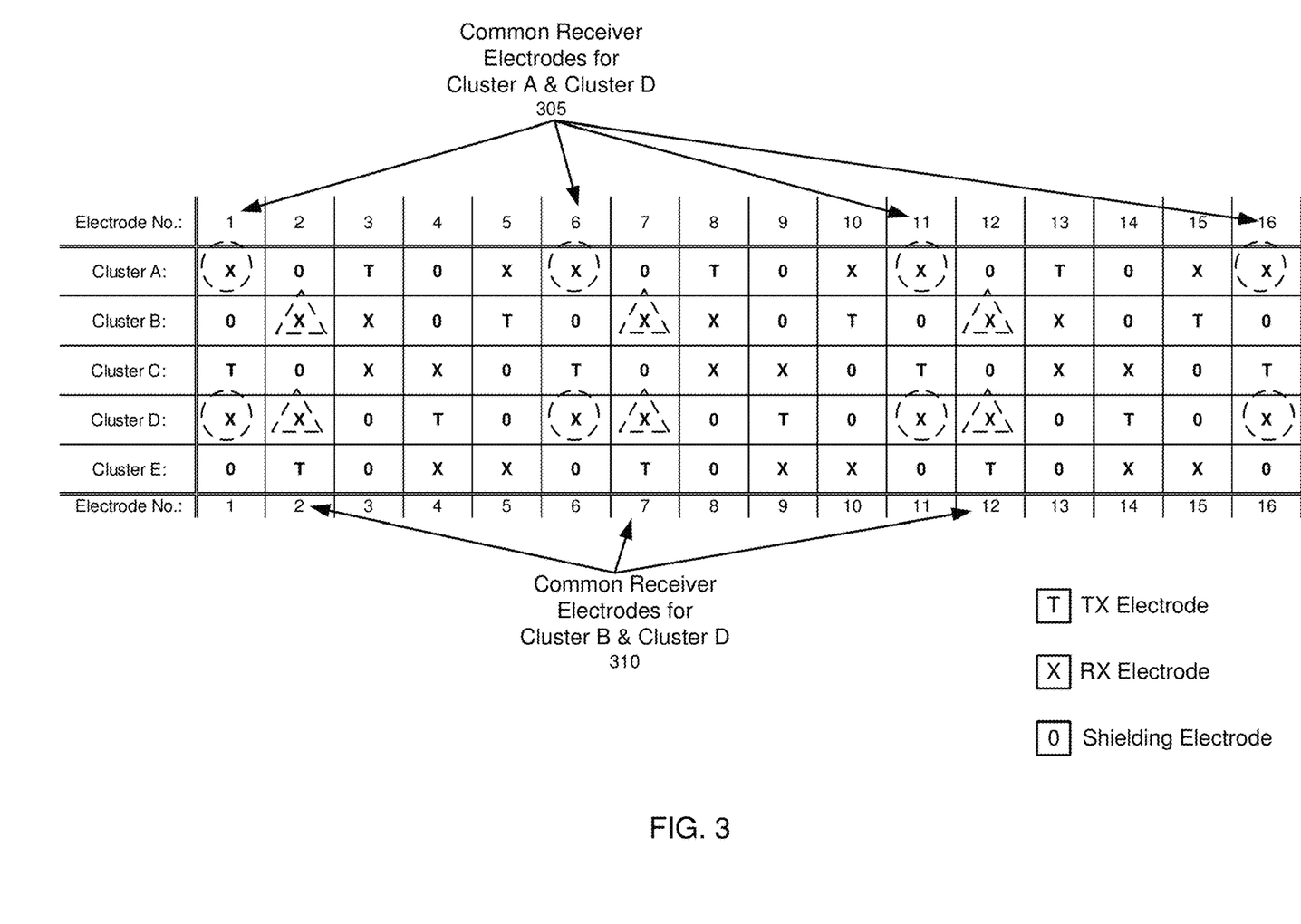
FIG. 3 shows electrode clusters in accordance with one or more embodiments.

FIG. 3 shows electrode clusters in accordance with one or more embodiments. Specifically, there may be 16 electrodes numbered 1 through 16. These 16 electrodes may correspond to the parallel (or approximately parallel) electrodes (e.g., electrode A (205A), electrode B (205B), electrode C (205C), etc.), discussed above in reference to FIG. 2.

During different timeslots, these 16 electrodes (i.e., electrode nos. 1-16) may be operated as different clusters (e.g., cluster A, cluster B, cluster C, cluster D, cluster E). A cluster refers to the arrangement (e.g., pattern) of transmitter electrodes, receiver electrodes, and shielding electrodes. In other words, a cluster refers to how the electrodes are configured (i.e., which electrodes are configured as transmitter electrodes, which electrodes are configured as receiver electrodes, which electrodes are configured as shielding electrodes, etc.).

In FIG. 3, cluster A follows the repeated pattern of 0T0XX, where 0 is a shielding electrode, T is a transmitter electrode, and X is a receiver electrode. In one or more embodiments, cluster B is a shifted version of cluster A, cluster C is a shifted version of cluster B, cluster D is a shifted version of cluster C, and cluster E is a shifted version of cluster D. An electrode may be configured as a transmitter electrode in one cluster, configured as a receiver electrode in a another cluster, and configured as shielding electrode in yet another cluster. For example, electrode no. 4 is configured as a receiver electrode in cluster A, configured as a transmitter electrode in cluster B, and configured as a shielding electrode in cluster C.

In one or more embodiments, signal values are determined from each of the receiving electrodes in a cluster. For example, when the electrodes are operating as cluster E, signal values are determined from electrode nos. 4, 5, 9, 10, 14, and 15 because electrode nos. 4, 5, 9, 10, 14, and 15 are configured as receiver electrodes in cluster E. One or more of these signal values may reflect the presence, if any, of an input object in the sensing region.

In one or more embodiments, a maximum value may be determined for each cluster. The maximum value of a cluster is the maximum signal value determined from any receiver electrode in the cluster. Moreover, a weighted maximum value may be determined by calculating a weighted average of the maximum values for the clusters (discussed below).

In one or more embodiments, the signal values for the receiver electrodes of a cluster may be scaled. In one or more embodiments, one of the clusters is selected as the reference cluster, while the remaining clusters are referred to as auxiliary clusters. The reference cluster may correspond to the cluster with the largest maximum value among the clusters. Additionally or alternatively, the reference cluster may correspond to the cluster with the smallest maximum value or median maximum value among the clusters. The signal values of the receiver electrodes of an auxiliary cluster may be scaled based on a gain (G) between the reference cluster and the auxiliary cluster. The scaling may be executed to make the gain across the clusters uniform or approximately uniform.

In FIG. 3, assume cluster A is the reference cluster. Accordingly, cluster B, cluster C, cluster D, and cluster E are auxiliary clusters. As shown in FIG. 3, cluster A and cluster D share common receiver electrodes (305). Specifically, electrode nos. 1, 6, 11, and 16 are configured as receiver electrodes in both cluster A and cluster D. The gain between cluster A and cluster D ($G_{AD}$) may be calculated as the ratio of the signal value of electrode no. 1 in cluster A to the signal value of electrode 1 is cluster D. Additionally or alternatively, a similar ratio may be calculated for each of electrode nos. 6, 11, and 16, and $G_{AD}$ may be calculated as the average of the ratios or median of the ratios. The signal value for each receiver electrode in cluster D may scaled by $G_{AD}$. Additionally or alternatively, let $\vec{A}$ and $\vec{D}$ be vectors containing the signal values in cluster A and the signal values in cluster D, respectively, of the common receiver electrodes (i.e., electrode nos. 1, 6, 11, and 16). Since $\vec{A}=G_{AD}\vec{D}$ is the theoretical relationship between $\vec{A}$ and $\vec{D}$, $G_{AD}$ may be calculated to minimize the least mean square error: $|\vec{A}-G_{AD}\vec{D}|^2$.

As shown in FIG. 3, cluster A and cluster B do not share any common receiver electrodes (i.e., no overlap in receiver electrodes). In other words, of the 16 electrodes (i.e., electrode nos. 1-16), there are no electrodes that are configured as receiver electrodes in both cluster A and cluster B. However, cluster B and cluster D share common receiver electrodes (310). Specifically, electrode nos. 2, 7, and 12 are configured as receiver electrodes in both cluster B and cluster D. Accordingly, the gain between cluster D and cluster B ($G_{DB}$) may be calculated as the ratio of the signal value of electrode no. 6 in cluster D to the signal value of electrode 7 is cluster B. Additionally or alternatively, a similar ratio may be calculated for each of electrode nos. 2, 7, and 12, and $G_{DB}$ may be calculated as the average of the ratios or median of the ratios. Additionally or alternatively, let $\vec{D}$ and $\vec{B}$ be vectors containing the signal values in cluster D and the signal values in cluster B, respectively, of the common receiver electrodes (i.e., electrode nos. 2, 7, and 12). Since $\vec{D}=G_{DB}\vec{B}$ is the theoretical relationship between $\vec{D}$ and $\vec{B}$, $G_{DB}$ may be calculated to minimize the least mean square error: $|\vec{D}-G_{DB}\vec{B}|^2$. $G_{AB}$ is the gain between cluster B and cluster A and may be calculated as $G_{AB}=G_{AD}\times G_{DB}$. The signal value for each receiver electrode in cluster B may be scaled by $G_{AB}$.

In one or more embodiments, after the appropriate scaling, the signal values for an electrode are summed. As discussed above, an electrode only has signal value when it is configured as a receiver electrode. For example, the signal value for electrode no. 1 in cluster A may be summed with the scaled signal value for electrode no. 1 in cluster D. As another example, the scaled signal value for electrode no. 2 in cluster B may be summed with the scaled signal value for electrode no. 2 in cluster D. As another example, the scaled signal value for electrode no. 3 in cluster B may be summed with the scaled signal value for electrode no. 3 in cluster C. As another example, the scaled signal value for electrode no. 4 in cluster C may be summed with the scaled signal value for electrode no. 4 in cluster E. As yet another example, the signal value for electrode no. 5 in cluster A may be summed with the scaled signal value for electrode no. 5 in cluster E, and so on. Following this process, there are multiple sums (i.e., one sum per electrode).

In one or more embodiments, a profile for the sensing region may be generated based on the sums. Specifically, the profile may correspond to a plot of each sum (e.g., sums on one axis) vs. the position of the corresponding electrode (i.e. electrode position on the other axis). In one or more embodiments, the sums are scaled such that the largest sum equals the weighted maximum value.

In one or more embodiments, by operating parallel (or approximately parallel) electrodes as clusters, by combining the scaled signal values from each cluster on an electrode-by-electrode basis, and then by scaling the sums based on the weighted maximum value, the resulting profile is likely to reflect the presence of an input object, even if the input object has a low ground mass and/or the input device is operating under low ground mass conditions. In other words, the profile is unlikely to suffer from shape distortion and the profile will likely have a large signal-to-noise ratio (SNR).

Although 16 electrodes exist in FIG. 3 (i.e., electrode nos. 1-16), in other embodiments, there may be any numbers of electrodes (e.g., 33). Further, although cluster A is the repeating pattern of 0T0XX, in other embodiments, other repeating patterns may be used. For example, the pattern 0T0XX0T0XXXX may be used for cluster A. Further still, although FIG. 3 shows 5 clusters (i.e., cluster A, cluster B, cluster C, cluster D, cluster E), in other embodiments, other numbers of clusters may be used and may be offset from each other by different shift amounts. In general, regardless of the pattern being used, there should be: (i) as few clusters as possible; (ii) a smaller number of consecutive receiving electrodes in order to detect smaller objects; (iii) dispersed transmitting electrodes such that they would achieve almost uniform gain across clusters; and (iv) overlapping receiver electrodes among clusters.

Figure 4:
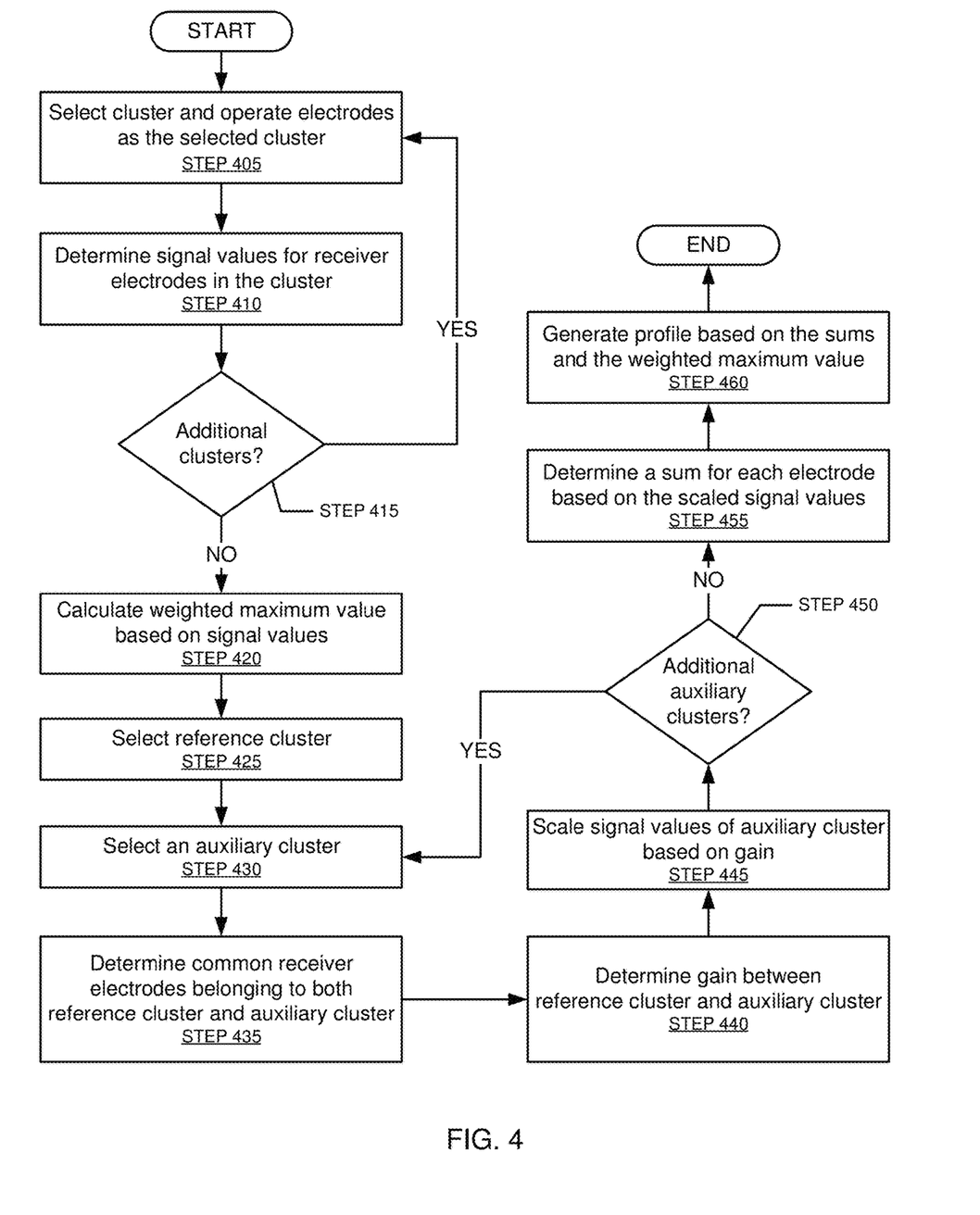
FIG. 4 shows a flowchart in accordance with one or more embodiments.

FIG. 4 shows a flowchart in accordance with one or more embodiments. The flowchart of FIG. 4 depicts a method for operating an input device. One or more of the steps in FIG. 4 may be performed by the components of the input device (100) (e.g., processing system (110)), discussed above in reference to FIG. 1. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

Initially, a cluster is selected and the electrodes are operated as the selected cluster for the current timeslot (STEP 405). As also discussed above, a cluster refers to the arrangement (e.g., pattern) of transmitter electrodes, receiver electrodes, and shielding electrodes. In other words, a cluster refers to how the electrodes are configured (i.e., which electrodes are configured as transmitter electrodes, which electrodes are configured as receiver electrodes, which electrodes are configured as shielding electrodes, etc.). If STEP 405 is being executed for the first time, a cluster may be selected at random. If STEP 405 is not being executed for the first time, a cluster that has not yet been selected is selected.

In STEP 410, signal values are determined from receiver electrodes in the cluster. As discussed above, all of the electrodes (e.g., transmitter and receiver electrodes) are aligned with an axis (i.e., the electrodes are parallel or approximately parallel with the axis). The signal values reflect any change in the capacitance between the transmitter electrodes and the receiver electrodes due to the presence of an input object in the sensing region.

In STEP 415, it is determined if there exists additional clusters that have not yet been selected. When it is determined that there are additional clusters that have not yet been selected, the process returns to STEP 405 and a cluster is selected for the next timeslot. However, when it is determined that all of the clusters have been selected, the process proceeds to STP 420.

In STEP 420, a weighted maximum value may be calculated. Calculating the weighted maximum value may include calculating a maximum value for each cluster. The maximum value of a cluster is the maximum signal value for a receiver electrode in the cluster.

In one or more embodiments, the maximum value for a cluster is scaled by the number of receiver electrodes (i.e., the cardinality of receiver electrodes) in the cluster. In one or more embodiments, the maximum value for a cluster is scaled by the number of receiver electrodes in the cluster with a signal value satisfying a threshold (e.g., equaling or in excess of the threshold).

The weighted maximum value may be calculated by summing the scaled maximum values for the clusters and then dividing the sum by either the total number of receiver electrodes in all clusters or the total number of receiver electrodes in all clusters with a signal value that satisfies the threshold.

Let numSamples$_N$ be the number of receiver electrodes in cluster N with a signal value in excess of the threshold, and maxValue$_N$ is the maximum signal value in cluster N. Then, the weighted maximum value may be express as:

$$\frac{\sum (numSamples_i * maxValue_i)}{\sum (numSamples_i)}$$

In STEP 425, a reference cluster is selected. The reference cluster may be the cluster with the largest maximum value, the cluster with the smallest maximum value, the cluster with the median maximum value, etc. Additionally or alternatively, the reference cluster may be selected at random.

In STEP 430, an auxiliary cluster is selected. All clusters except the reference cluster may be referred to as auxiliary clusters. If this is the first execution of STEP 430, an auxiliary cluster may be selected at random. If this is not the first execution of STEP 430, an auxiliary cluster that has not yet been selected is selected.

In STEP 435, common receiver electrodes belonging to both the reference cluster and the selected auxiliary cluster are determined. As discussed above, for example, if electrode no. 5 is configured as a receiver electrode in both the reference cluster and the selected auxiliary cluster, electrode no. 5 is a common receiver electrode belonging to both the reference cluster and the auxiliary cluster. There may be multiple receiver electrodes that are common to both the reference cluster and the selected auxiliary cluster.

In STEP 440, a gain is determined between the reference cluster and the selected auxiliary cluster. As discussed above, the gain may be based on one or more ratios and/or least mean square errors involving signal values (obtained in STEP 410) for the common receiver electrodes belonging to both the reference cluster and the auxiliary cluster.

In STEP 445, the signal values of all receiver electrodes in the auxiliary cluster (obtained in STEP 410) are scaled based on the gain.

As discussed above, in some cases, there may not be any common receiver electrodes belonging to the reference cluster and the selected auxiliary cluster (i.e., no overlap in receiver electrodes). In such cases, as also discussed above, it may be necessary to calculate a gain between the selected auxiliary cluster and a secondary auxiliary cluster that does have common receiver electrodes with the reference cluster. The gain (G) between the reference cluster and the selected auxiliary cluster may be the product of: (a) the gain between the reference cluster and the secondary auxiliary cluster; and (b) the gain between the secondary auxiliary cluster and the selected auxiliary cluster. For example, $G_{AB}=G_{AD} \times G_{DB}$, where cluster A is the reference cluster, cluster B is the selected auxiliary cluster with no common receiver electrodes with cluster A, and cluster D is the secondary auxiliary cluster that does have common receiver electrodes with reference cluster A.

In STEP 450, it is determined whether there are any auxiliary clusters that have not yet been selected. When it is determined there is at least one auxiliary cluster that has not yet been selected, the process returns to STEP 430. When it is determined that all auxiliary clusters have been selected the process proceeds to STEP 455.

In STEP 455, a sum is determined for each electrode. If the electrode is configured as a receiver electrode in the reference cluster, the sum for the electrode is the signal value for the electrode in the reference cluster summed with the scaled signal values for the electrode in the auxiliary clusters. If the electrode is not configured as a receiver electrode in the reference cluster, the sum for the electrode is the sum of the scaled signal values for the electrode across the auxiliary clusters. As discussed above, in any cluster, an electrode only has a signal value (or a scaled signal value) if it is configured as a receiver electrode in the cluster. Following execution of STEP 455, there exists multiple sums (i.e., one sum per electrode).

In STEP 460, a profile is generated. The profile may be generated by scaling the sums such that the largest sum equals the weighted maximum value (calculated in STEP 420). The profile may correspond to a plot of the scaled sums vs. the positions of the electrodes. The profile may reflect the presence of an input object.

In one or more embodiments, by operating parallel (or approximately parallel) electrodes as clusters, by combining the scaled signal values from each cluster on an electrode-by-electrode basis, and then by scaling the sums based on the weighted maximum value, the resulting profile is likely to reflect the presence of an input object, even if the input object has a low ground mass and/or the input device is operating under low ground mass conditions. In other words, the profile is unlikely to suffer from shape distortion and the profile will likely have a large signal-to-noise ratio (SNR).

In one or more embodiments, the process of FIG. 4 may be repeated in order to generate multiple profiles and track movement of the input object over time. Additionally or alternatively, the process may be repeated for different set of electrodes (e.g., orthogonal electrodes (210)) in order to generate multiple profiles along different axis for the sensing region.

Figure 5:
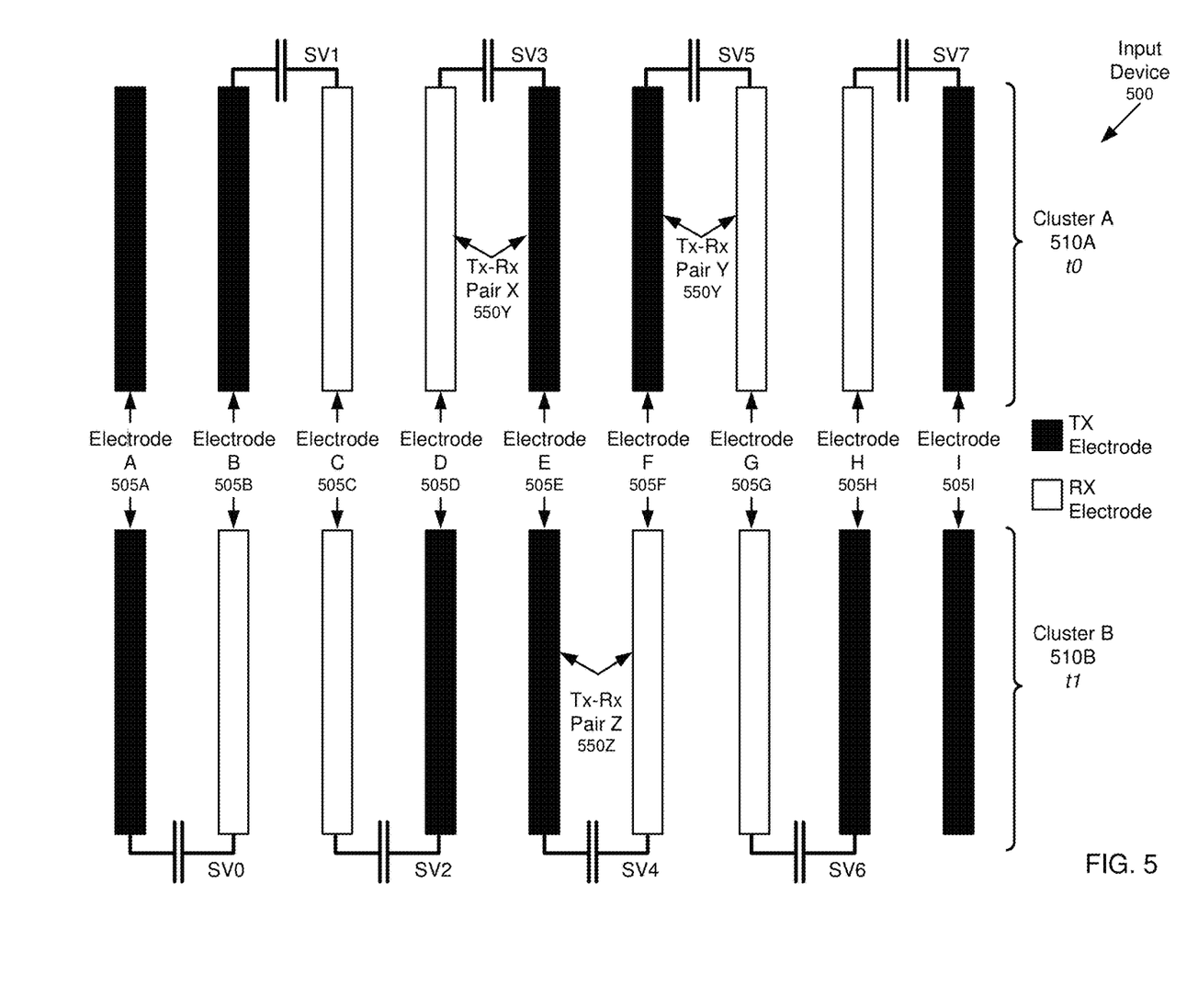
FIG. 5 shows an input device in accordance with one or more embodiments.

FIG. 5 shows an input device (500) in accordance with one or more embodiments. As shown in FIG. 5, the input device has multiple electrodes including electrode A (505A), electrode B (505B), electrode C (505C), electrode D (505D), electrode E (505E), electrode F (505F), electrode G (505G), electrode H (505H), and electrode I (505I). The electrodes (505A, 505B, 505C, 505D, 505E, 505F, 505G, 505H, 505I) are aligned with an axis (i.e., the electrodes are parallel or approximately parallel with an axis). Further, the electrodes may be coupled to processing system (110), discussed above in reference to FIG. 1.

In one or more embodiments, the electrodes are operated as different clusters in different time slots. For example, at timeslot t0, the electrodes are operated as cluster A (510A). In cluster A (510A), some electrodes (e.g., electrode D (505D), electrode G (505G)) are configured as receiver electrodes, while some electrodes (e.g., electrode B (505B), electrode E (505E)) are configured as transmitter electrodes. In timeslot t1, the electrodes are operated as cluster B (510B). In cluster B (510B), some electrodes (e.g., electrode C (505C), electrode F (505F)) are configured as receiver electrodes, while some electrodes (e.g., electrode D (505D), electrode E (505E)) are configured as transmitter electrodes. In one or more embodiments, cluster B (510B) is the pattern of cluster A (510) shifted to the left by 1.

In one or more embodiments, in a cluster (510A, 510B), adjacent transmitter and receiver electrodes are referred to as transmitter-receiver (Tx-Rx) pairs. Each cluster (510A, 510B) has one or more transmitter-receiver (Tx-Rx) pairs. For example, cluster A (510A) has multiple Tx-Rx pairs including Tx-Rx pair X (550X) and Tx-Rx pair Y (550Y). As another example, cluster B (510B) has multiple Tx-Rx pairs including Tx-RX pair Z (550Z).

In one or more embodiments, a signal value (SV) is determined for each Tx-Rx pair. The signal value reflects the capacitance between the Tx-Rx pair and any changes to the capacitance due to the presence of an input object. In one or more embodiments, the signal value is the measured capacitance. The signal value may be assigned to the right-most electrode of each Tx-Rx pair. For example, SV1, SV3, SV5, and SV7 are assigned to electrode C (505C), electrode E (505E), electrode G (505G), and electrode I (505I), respectively, because they are the right-most electrodes of their respective Tx-Rx pairs. Similarly, SV0, SV2, SV4, and SV6 are assigned to electrode B (505B), electrode D (505D), electrode F (505F), and electrode H (505H), respectively, because they are the right-most electrodes of their respective Tx-Rx pairs. In one or more embodiments, there is no overlap in the electrodes that are assigned signal values in cluster A (510A) and the electrodes that are assigned signal values in cluster B (510B).

In one or more embodiments, following operation as cluster A (510A) and as cluster B (510B), all of the interior electrodes have been assigned a signal value. Boundary electrode A (505A) may be assigned the same signal value as adjacent electrode B (505B) (not shown).

In one or more embodiments, a profile may be generated based on the assigned signal values. Generating the profile may include subtracting an initial baseline from each of the assigned signal values. The profile may correspond to a plot of signal values vs. electrode positions. The plot may be used to detect the presence and location of an input object.

In one or more embodiments, the profile may be generated by averaging the signal value assigned to each electrode with the signal value assigned to a neighboring electrode. In other words, instead of the profile having SV0 at the position of electrode B (505B), the profile has (SV0+SV1)/2 at the position of electrode B (505B). Similarly, instead of the profile having SV1 at the position of electrode C (505C), the profile has (SV1+SV2)/2 at the position of electrode C (505C), and so on. The averaging reflects that individual signal values correspond to capacitance between electrodes and not "at" the electrodes themselves.

As discussed above, in FIG. 5, each signal value is assigned to the right-most electrode in a Tx-Rx pair. This is only an example of assigning signal values. As another example, the signal values may be assigned to the left-most electrodes of each Tx-Rx pair. As another example, the signal values may be assigned to the receiver electrode of each Tx-Rx pair, regardless of whether the receiver electrode is the left-most or right-most electrode of the Tx-Rx pair. As another example, the signal value may be assigned to the transmitter electrode of each Tx-Rx pair, regardless of whether the transmitter electrode is the left-most or right-most electrode of the Tx-Rx pair.

Although FIG. 5 only shows two clusters (510A, 510B), in other embodiments, there may be any number of clusters. For example, assume there are four clusters: cluster M, cluster N, cluster O, and cluster P. Moreover, assume cluster M is identical to cluster A (510A), cluster N is cluster M shifted left by one, cluster O is cluster N shifted left by one, and cluster P is cluster O shifted left by one. During operation as any one of the clusters (M, N, O, P), the determined signal value may always be assigned to the receiver electrode of each Tx-Rx pair, regardless of whether the receiver electrode is the left-most or right-most electrode of the Tx-Rx pair. Following operation as the four clusters M, N, O, P (a four cluster process), two signal values would be assigned to each interior electrode, while one signal value would be assigned to each boundary electrode. For each electrode assigned multiple signal values, the average of the multiple signal values may be assigned to the electrode. Generating a profile based on the average signal values results in the same profile as the profile resulting from using cluster A (510A) and cluster B (510B) (a two cluster process).

In one or more embodiments, other excitation orders are also possible. For example, the electrodes may be operated at time t0 as cluster 1={R, T, R, T, R, T . . . }, and at time t1 as cluster 2={T, R, T, R, T, . . . }, with appropriate deconvolution to get the signal values assigned to the corresponding electrodes. Even though these cluster are more straightforward than those introduced in FIG. 5 and have a simple deconvolution, a drawback may be that the noise level is being enhanced in the process. As yet another example, the electrodes may be operated at time t0 as cluster 1 with a repeating pattern of {R, R, R, T, T}, at time t1 as cluster 2 with a repeating pattern of {T, R, R, R, T}, and at time 2 as cluster 3 with a repeating pattern of {T, T, R, R, R}. Notice that in these clusters, all the receiver measurements can be used for postprocessing purposes, or only a subset of these measurements could be used instead. For example, only the measurements of the receiver which has direct receiver neighbors to its left and right could be used, while the receivers adjacent to a transmitter would act just as ground.

Figure 6:
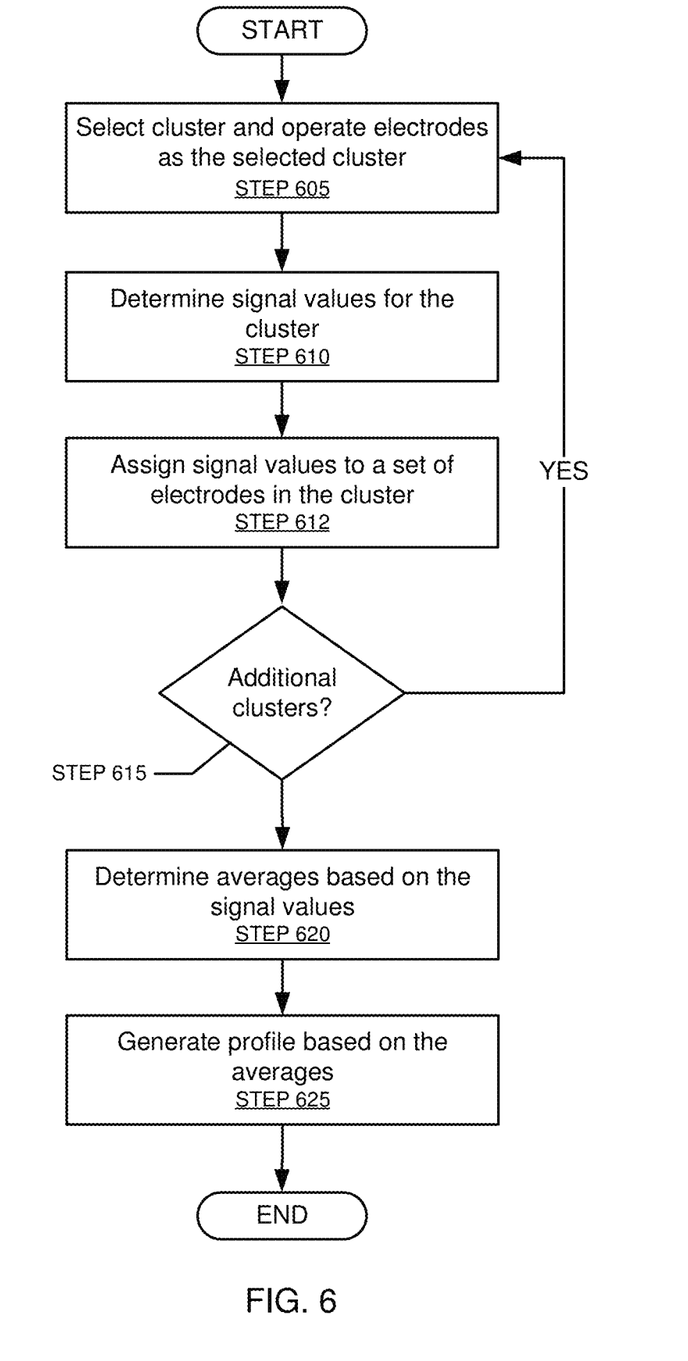
FIG. 6 shows a flowchart in accordance with one or more embodiments.

FIG. 6 shows a flowchart in accordance with one or more embodiments. The flowchart of FIG. 6 depicts a method for operating an input device. One or more of the steps in FIG. 6 may be performed by the components of the input device (100) (e.g., processing system (110)), discussed above in reference to FIG. 1. In one or more embodiments, one or more of the steps shown in FIG. 6 may be omitted, repeated, and/or performed in a different order than the order shown in FIG. 6. Accordingly, the scope of the invention should not be considered limited to the specific arrangement of steps shown in FIG. 6.

Initially, a cluster is selected and the electrodes are operated as the selected cluster for the current timeslot (STEP 605). In one or more embodiments, there are only two clusters (e.g., cluster A (510A) and cluster B (510B) (discussed above)) to select from. In one or more embodiments, there are four clusters to select from (e.g., cluster M, cluster N, cluster O, and cluster P (discussed above)) to select from. Other clusters are also possible. In one or more embodiments, all of the electrodes are aligned with an axis (i.e., the electrodes are parallel or approximately parallel with the axis).

In STEP 610, signal values are determined for the cluster. As discussed above, each cluster may have multiple Tx-Rx pairs. A signal value may reflect the capacitance between the transmitter electrode and the receiver electrode in a Tx-Rx pair due to the presence of an input object in the sensing region.

In STEP 612, the signal values are assigned to electrodes. In one or more embodiments, each signal value is assigned to the right-most electrode in each Tx-Rx pair. In one or more embodiment, each signal value is assigned to the receiver electrode in each Tx-Rx pair, regardless of whether the receiver electrode is the left-most or right-most electrode. Other assignments are also possible.

In STEP 615, it is determined whether there is at least one additional cluster that has not been selected. When it is determined there is at least one additional cluster (e.g., the electrodes have only been operated as one cluster in a two cluster process, the electrode have only been operated as two clusters in a four cluster process, etc.) the process returns to STEP 605. When it is determined that there are no additional clusters, the process proceeds to STEP 620.

In STEP 620, average signal values are calculated. For example, after operating as multiple clusters, each electrode may have been assigned multiple signal values. The multiple signal values assigned to an electrode may be averaged. Additionally or alternatively, in embodiments where only one signal value is assigned to an interior electrode, the signal value assigned to the interior electrode may be averaged with the signal value assigned to a neighboring interior electrode. In one or more embodiments, an initial baseline is subtracted from the signal values before or after calculating the averages. Alternatively to averaging, the values may be assigned directly to the discrete locations of the capacitances which lie between the two closest electrodes in parallel. If the capacitive values need to be determined at the locations of the electrodes, other interpolation techniques may be used, and these interpolation techniques may make use of more than just the two immediate neighbors.

In STEP 625, a profile is generated. The profile may correspond to a plot of the averaged signal values vs. the positions of the electrodes. The profile may reflect the presence of an input object.

In one or more embodiments, by operating parallel (or approximately parallel) electrodes as clusters, by assigning signal values to electrodes, and by averaging the signal values assigned to electrodes, the resulting profile is likely to reflect the presence of an input object, even if the input object has a low ground mass and/or the input device is operating under low ground mass conditions. Moreover, the profile may be used to detect the presence of water drops/moisture on the input device.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An input device associated with a sensing region, comprising:
    sensor circuitry configured to:
        operate, during a first timeslot, a plurality of electrodes as a first cluster,
        operate, during a second timeslot, the plurality of electrodes as a second cluster,
        operate, during a third timeslot, the plurality of electrodes as a third cluster, and
        wherein the plurality of electrodes is aligned with an axis, and
        wherein at least one of the plurality of electrodes operates as a transmitter in the first cluster and as a receiver in the second cluster; and
    determination circuitry configured to:
        determine a first set of signal values associated with a first set of electrodes in the first cluster,
        determine a second set of signal values associated with a second set of electrodes in the second cluster,
        determine a third set of signal values associated with a third set of electrodes in the third cluster, wherein the third set of electrodes are receiver electrodes, wherein there is no overlap between the first set of electrodes and the third set of electrodes,
        determine a first gain between the second cluster and the third cluster,
        scale the third set of signal values based on the first gain,
        determine a plurality of sums based on the first set of signal values and the second set of signal values,
        wherein the plurality of sums is further based on the third set of signal values after the third set of signal values are scaled, and
        generate, based on the plurality of sums, a profile for the sensing region based on the first set of signal values and the second set of signal values,
        wherein the profile reflects an input object in the sensing region.

2. The input device of claim 1, wherein the determination circuitry is further configured to:
    determine a first maximum value of the first set of signal values;
    determine a second maximum value of the second set of signal values;
    determine a third maximum value of the third set of signal values; and
    determine a weighted maximum value based on the first maximum value, the second maximum value, the third maximum value, a cardinality of the first set of electrodes, a cardinality of the second set of electrodes, and a cardinality of the third set of electrodes,
    wherein the profile is further based on scaling the plurality of sums based on the weighted maximum value.

3. The input device of claim 1, wherein:
    the first cluster comprises a first plurality of transmitter-receiver (Tx-Rx) pairs;
    the second cluster comprises a second plurality of Tx-Rx pairs;
    the second cluster is a shifted version of the first cluster;
    the first set of signal values are assigned to the first set of electrodes; and
    the second set of signal values are assigned to the second set of electrodes.

4. The input device of claim 3, wherein:
    the first set of electrodes comprises at least one transmitter electrode and at least one receiver electrode;
    the second set of electrodes comprises at least one transmitter electrode and at least one receiver electrode;
    each of the first plurality of Tx-Rx pairs comprises one of the first set of electrodes;
    each of the second plurality of Tx-Rx pairs comprises one of the second set of electrodes; and
    there is no overlap between the first set of electrodes and the second set of electrodes.

5. The input device of claim 3, wherein:
    one of the first set of signal values is assigned to a boundary electrode.

6. An input device associated with a sensing region, comprising:
    sensor circuitry configured to:
        operate, during a first timeslot, a plurality of electrodes as a first cluster, wherein the first cluster is a repeating pattern of 0T0RR,
        operate, during a second timeslot, the plurality of electrodes as a second cluster, wherein the second cluster is a shifted version of the first cluster, and
        wherein T is transmitter electrode, R is receiver electrode, and 0 is shielding electrode,
        wherein the plurality of electrodes is aligned with an axis, and
        wherein at least one of the plurality of electrodes operates as a transmitter in the first cluster and as a receiver in the second cluster; and
    determination circuitry configured to:
        determine a first set of signal values associated with a first set of electrodes in the first cluster, determine a second set of signal values associated with a second set of electrodes in the second cluster, determine a plurality of sums based on the first set of signal values and the second set of signal values, and generate, based on the plurality of sums, a profile for the sensing region based on the first set of signal values and the second set of signal values, wherein the profile reflects an input object in the sensing region.

7. A method for operating an input device associated with a sensing region, comprising:

operating, during a first timeslot, a plurality of electrodes as a first cluster;

operating, during a second timeslot, the plurality of electrodes as a second cluster, wherein the plurality of electrodes is aligned with an axis, and wherein at least one of the plurality of electrodes operates as a transmitter in the first cluster and as a receiver in the second cluster;

determining a first set of signal values associated with a first set of electrodes in the first cluster;

determining a second set of signal values associated with a second set of electrodes in the second cluster;

determining a plurality of sums based on the first set of signal values and the second set of signal values;

determining a first maximum value of the first set of signal values;

determining a second maximum value of the second set of signal values;

determine a weighted maximum value based on the first maximum value, the second maximum value, a cardinality of the first set of electrodes, and a cardinality of the second set of electrodes, and generating, based on the plurality of sums, a profile for the sensing region based on the first set of signal values and the second set of signal values, wherein the profile is further based on scaling the plurality of sums based on the weighted maximum value, wherein the profile reflects an input object in the sensing region.

8. The method of claim 7, further comprising:

assigning the first set of signal values to the first set of electrodes; and assigning the second set of signal values to the second set of electrodes, wherein the first cluster comprises a first plurality of transmitter-receiver (Tx-Rx) pairs, wherein the second cluster comprises a second plurality of Tx-Rx pairs, and wherein the second cluster is a shifted version of the first cluster.

9. The method of claim 8, wherein the first set of electrodes comprises at least one transmitter electrode and at least one receiver electrode;

the second set of electrodes comprises at least one transmitter electrode and at least one receiver electrode;

each of the first plurality of Tx-Rx pairs comprises one of the first set of electrodes;

each of the second plurality of Tx-Rx pairs comprises one of the second set of electrodes; and there is no overlap between the first set of electrodes and the second set of electrodes.

10. A method for operating an input device associated with a sensing region, comprising:

operating, during a first timeslot, a plurality of electrodes as a first cluster, wherein the first cluster is a repeating pattern of 0T0RR;

operating, during a second timeslot, the plurality of electrodes as a second cluster, wherein the second cluster is a shifted version of the first cluster; and wherein T is transmitter electrode, R is receiver electrode, and 0 is shielding electrode, wherein the plurality of electrodes is aligned with an axis, and wherein at least one of the plurality of electrodes operates as a transmitter in the first cluster and as a receiver in the second cluster;

determining a first set of signal values associated with a first set of electrodes in the first cluster;

determining a second set of signal values associated with a second set of electrodes in the second cluster;

determining a plurality of sums based on the first set of signal values and the second set of signal values; and generating, based on the plurality of sums, a profile for the sensing region based on the first set of signal values and the second set of signal values, wherein the profile reflects an input object in the sensing region.

* * * * *